Jan. 29, 1963 A. W. KINGSTON 3,075,717

APPARATUS FOR MAKING RECORDS AND/OR REPRODUCING RECORDS FROM STRIP MATERIAL AND MAGAZINES FOR SUCH STRIP MATERIAL

Filed Nov. 3, 1958 3 Sheets-Sheet 1

INVENTOR
Arthur W. Kingston
BY
Ralph B. Stewart
ATTORNEY

APPARATUS FOR MAKING RECORDS AND/OR REPRODUCING RECORDS FROM STRIP MATERIAL AND MAGAZINES FOR SUCH STRIP MATERIAL

Filed Nov. 3, 1958 3 Sheets-Sheet 2

INVENTOR
Arthur W. Kingston
BY
Ralph B. Stewart
ATTORNEY

INVENTOR
Arthur W. Kingston
BY
Ralph B. Stewart
ATTORNEY

United States Patent Office 3,075,717

Patented Jan. 29, 1963

3,075,717

APPARATUS FOR MAKING RECORDS AND/OR REPRODUCING RECORDS FROM STRIP MATERIAL AND MAGAZINES FOR SUCH STRIP MATERIAL

Arthur William Kingston, Old Mill House, Denham, England

Filed Nov. 3, 1958, Ser. No. 771,419
Claims priority, application Great Britain Nov. 5, 1957
11 Claims. (Cl. 242—55.13)

The present invention relates to apparatus for making records on and/or for reproducing records from strip material and magazines for such strip material and is paticularly though not exclusively concerned with magnetic tape sound recording and/or reproducing apparatus, and magnetic tape magazines.

In magnetic tape sound recording and reproducing apparatus which has been proposed, it is usually necessary to thread the free end of the tape carried by a feed spool through one or more components of the apparatus and on to a take-up spool. This is an undesirable time absorbing and tedious procedure.

To dispense with this undesirable procedure it has been proposed to provide a magazine of the kind comprising a feed spool and a take-up spool rotatably mounted within a casing so as to lie in the same plane but in a predetermined space relationship. The feed spool is loaded with magnetic tape, the outer end of which passes over guides and is wound on to the take-up spool. A recording and/or reproducing apparatus adapted to accommodate such magazines is provided and the magazine is so placed on the apparatus that an exposed portion of the tape between the two spools co-operates with the various recording and reproducing and drive stabilising components of the apparatus. The tedious procedure of threading the exposed portion of the tape between the various components of the apparatus, however, remains.

It is the principal object of this invention to provide a magnetic tape sound recording apparatus in which the aforesaid tedious procedure can be more readily carried out.

According to the present invention there is provided a magazine for strip recording material comprising a feed spool and a take-up spool rotatably mounted within a casing so as to lie in spaced relationship therein, strip from the feed spool passing over guides to the take-up spool, and a strip tensioning device so biased as to tend to rotate one or both spools in a sense or senses such as to bring the part of the strip between the spools under tension, and being adapted to be moved against the action of said bias to a disengaged position.

Preferably, the spools are in edge-to-edge spaced relationship and said strip tensioning device is mounted in the casing and is located in a region between the spools and comprises spool engaging means and spring biasing means adapted to act on said spool engaging means and cause the latter to engage the peripheries of the two spools simultaneously.

A magazine according to the present invention greatly facilitates the mounting of the magazine on to the recording and reproducing apparatus. The strip is kept taut by the tensioning device and threading between the various components on the apparatus which it is required to traverse becomes a simple operation.

There is however the tedious procedure of bringing the magazine spool axles into registration with the respective driving spindles on the apparatus and then simultaneously into locking engagement therewith.

It has been proposed to provide apparatus adapted to accommodate a magazine of the kind specified and comprising a pair of driving spindles adapted to be engaged by the driving axles of the magazine spools by movement thereto along a common axis of rotation, parts on said axles being adapted to interlock with parts on said spindles to prevent relative rotation of the axle and the spindle and means spring loading the spindle to allow axial displacement of the spindle until re-orientation of the interlocking parts when the apparatus is operated permits interengagement of said parts.

Preferably, the interlocking parts on said spindle comprise a plurality of axially directed splines which engage an internally splined tube constituting the spool axle.

It will be appreciated that apparatus so adapted to accommodate such a magazine cannot be used without modification to accommodate spools of conventional type adapted to interlock with a plurality of radial projections on the spindle.

According to an embodiment of the invention, there is provided apparatus for making records on and/or reproducing records from strip material, the apparatus being adapted to accommodate a magazine according to the present invention and comprising a pair of driving spindles adapted to be engaged by the driving axles of the magazine spools by movement thereto along a common axis of rotation, parts on said axles being adapted to interlock with parts on said spindles to prevent relative rotation of the axle and the spindle and means spring loading the spindle to allow axial displacement of the spindle until re-orientation of the interlocking parts when the apparatus is operated permits interengagement of said parts, and additional interlocking means provided on each spindle to interlock with a spool of conventional type as hereinbefore specified.

It will be appreciated that there are practical limits to the size of magazine that can be employed and that a reduction in size for a given tape capacity is highly desirable.

In a further embodiment, there is provided a magazine according to the invention wherein the feed spool and the take-up spool are rotatably mounted within the casing so as to lie in edge-to-edge relationship, strip material from the feed spool passing over guides in the casing to the take-up spool, the said spools carrying strip guiding parts for guiding and retaining the strip material thereon and the arrangement being such that a strip guiding part on one side of one spool serves simultaneously to guide and retain strip material on the spool adjacent thereto. Preferably, the strip guiding and retaining parts comprise a disc concentrically mounted on one side only of one spool and a further disc concentrically mounted on the other side only of the other spool.

A magnetic tape magazine of the kind hereinbefore referred to has been proposed, which is adapted for use with a twin or multiple track tape of the kind which bears or is adapted to bear on one face thereof two or more records in side-by-side relationship, one or more of the records being made in one direction along the length of the tape on a part to one side of the centre line and the other record or records in the opposite direction along the tape on a part to the other side of the centre line. The magazine is made symmetrical so that upon completion of a recording or reproduction by an excursion past a magnetic head of one part of the tape the magazine can be inverted on the apparatus and a further recording or reproduction carried out by an excursion past a magnetic head of the other part of the tape. Where records made on the two parts of the tape form a complete record to say a musical work, the procedure of inverting the magazine halfway through the reproduction of the work is disturbing.

According to yet another embodiment of the invention there is provided apparatus for making records on and/or reproducing records from strip material, comprising means adapted in one condition to make and/or reproduce from a record on one face of a recording strip in one direction along the length of the strip on a part thereof one side of a line extending along the length thereof and in another condition to make and/or reproduce from a further record on the said face in the opposite direction along the length of the strip on a further part thereof on the other side of said line, and control means responsive to a predetermined characteristic of the strip at the end of the record on the said one part to reverse the direction of movement of the strip and to switch the recording and/or reproducing means from the said one condition to the other condition.

Preferably, said control means comprises light responsive means so positioned as to receive light from a light source via a path crossed by the strip between the spools of the magazine, said strip in the region of one or each end being such as to cause a change in the light transmitted to the light responsive means and said light responsive means being responsive to said change to cause a reversal of the direction of movement of the spool strip.

Preferred embodiments of the invention will now be described by way of example with reference to the accompanying drawings in which.

Figure 1:
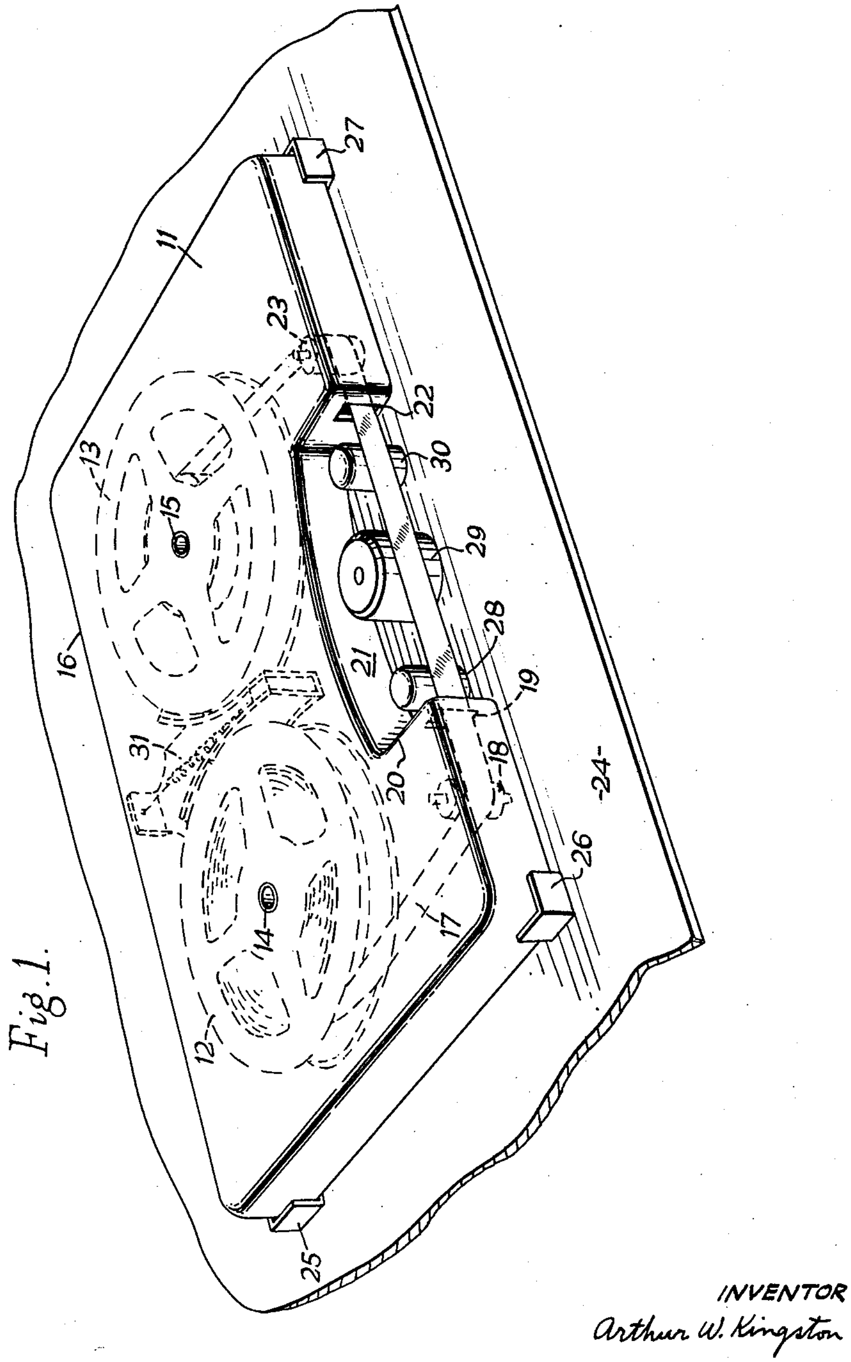
FIG. 1 is a perspective view of a magnetic tape magazine according to one embodiment of the invention, mounted on a magnetic tape recording and reproducing apparatus.

Referring first to FIG. 1, a magazine 11 for magnetic tape upon which sound has been recorded comprises a feed spool 12 and a take-up spool 13 carried by tubular axles 14 and 15 rotatably mounted in the upper and lower sides of a flat rectangular casing 16. As shown the spools 12 and 13 are arranged in edge-to-edge spaced relationship within the casing 16. Magnetic tape 17 from the feed spool 12 passes first over a guide roller 18, freely rotatable within the casing 16, through an opening 19 in the end wall 20 of a recessed portion 21 of the casing 16, through the recess along a line parallel to the front edge of the casing, through an opening 22 in the other end wall of the recessed portion 21, over a second guide roller 23, rotatably mounted in the casing 11, and on to the take-up spool 13.

The magazine 11 is mounted on a deck 24 of a magnetic sound recording and reproducing apparatus and is so positioned by guide pieces 25, 26, 27, that the magnetic tape 17 in the recessed portion 21 of the casing 11 passes in front of a magnetic recording and reproducing head 28, a capstan 29 and a further recording and reproducing head 30. The arrangement of the recording and reproducing apparatus is such that the head 28 is adapted to record and reproduce signals in the upper half of the tape 17 and the head 30 to record and reproduce signals on the lower half of the tape. The capstan 29 serves in known manner as a means of stabilising the speed of the tape 17.

In the space between the spools 12 and 13, there is provided within the casing 16 a tape tensioning and spool locking device 31, now to be described with reference to FIGS. 2 and 3. The device 31 comprises two identical arcuate braking members 32 and 33 consisting of resilient metal strips, each rigidly fixed at one end to an upright member 36 of a horizontal frame 37 and carrying a friction pad at its free end, as indicated by reference numerals 38 and 39.

The frame 37 is provided with two slots 40 and 41 through which pins 42 and 43 project. As shown in FIG. 3, pins 42 and 43 are fixedly mounted in the casing 16 and are provided with spacing collars 44 and 45 and securing collars 46 and 47, the collars 44 and 45 serving to space the frame 37 from the casing 16 and the securing collars serving to prevent the frame 37 from movement parallel to the longitudinal axes of the pins 42 and 43.

The pin 43 is longer than the pin 42 and carries out its uppermost point the end of a tension spring 48, the other end of which is fixed to an upturned end portion 49 of the frame 37. With such an arrangement the frame 37, together with the two arcuate braking members 32 and 33, is pulled by the action of the spring 48 to a position in which the pads 38 and 39 of the member 32 and 33 engage the spools 13 and 12. By virture of the resilience of the strips forming the braking members 32 and 33, the spools are rotated to some extent in the direction of arrows *f* and *g* and the tape 17 extending between the spools is drawn taut.

The frame 37 is provided in the central region thereof with a hole 50, which when the magazine is mounted on the tape deck 24 is engaged by the uppermost end of a pin 51 which passes through a slot 52 in the tape deck 24 and a slot 53 in the lower face of the casing 16. Movement of the pin 51 in the direction indicated by the arrow *h* in FIG. 3 causes the frame 37 to move in that direction and the braking members 32 and 33 to move out of engagement with the spools 12 and 13.

Referring again to FIG. 1, it will be appreciated from what has so far been described that the positioning of the magazine on the tape deck can be made rapidly. Although there may be only a very small clearance for the tape between the capstan roller 29 and magnetic heads 28 and 30 on one side and the mechanism for moving the tape into engagement with these components on the other side, the tape tensioning device 31 is operative during assembly and the tape 17 in the recessed portion 21 is kept taut and straight and no difficulty should be experienced in locating the magazine in the operative position on the tape deck within the guide pieces 25, 26, 27. When the magazine is positioned as shown and the apparatus set to operate, a mechanism (not shown) causes the pin 51 to move vertically into engagement with the frame 37 and then in the direction of the arrow *h* in FIG. 3 to move the tape tensioning device 31 out of engagement with the spools.

Figure 4:
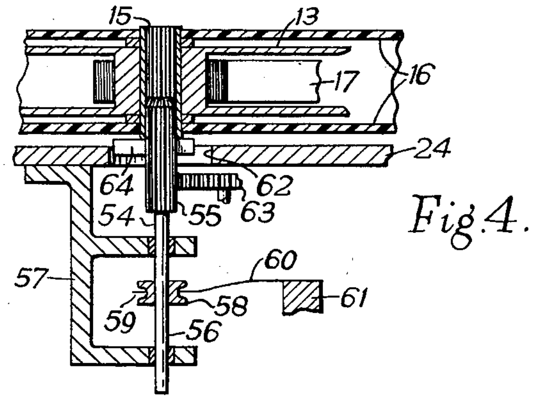
FIG. 4 is a sectional view of the magazine shown in FIG. 2, taken along the line IV—IV.

Referring now to FIG. 4, the tape deck 24 is provided with two spool driving spindles so positioned as to be engaged by the tubular axles 14 and 15 projecting from the casing 16 of the magazine 11. One spindle 54 is shown in FIG. 4 and comprises an upper enlarged portion 55 bearing external axially-directed splines and a lower portion 56 rotatably mounted in bearings in a frame 57 and carrying a collar 58 rigidly fixed thereto. The collar 58 is formed with a groove 59 which is engaged by the end of a leaf spring 60 fixed at its other end to a support 61. The spring arrangement is such that the spindle 54 is urged upwardly through a hole 62 in the tape deck 24 but can be depressed against the action of the spring 60 so that the uppermost end of the splined portion 55 is flush with the upper surface of the tape deck 24. As shown, the tubular axles of the spools 12 and 13 are internally splined and in the normal course of events when the magazine is lowered into position on the tape deck 24 the splined portion 55 of the spindle 54 engages in the tubular axle 15 of the spool 13. If, however, the splines on the axle 15 do not register with the splines on the portion 55, the spindle 54 is depressed against the action of spring 60 and remains depressed until the apparatus is set in operation and slight rotation of spindle 54 brings the splines into registration, whereupon the spindle 54 engages in the axle 15 and takes up the position shown in FIG. 4. The drive for the spindle 54 is provided by a gear 63 which meshes with the splined portion 55 of the spindle 54.

It will be appreciated that apparatus provided with such spindles cannot be used without modification to record on or reproduce from tapes carried by spools of other types. A form of spool now in wide use is provided on each side thereof with three equally spaced slots extending radially from a spindle hole at the spool axis, and the spindle on the apparatus adapted to accommodate these spools consists of a smooth spindle with three corresponding radially extending projections.

Figure 2:
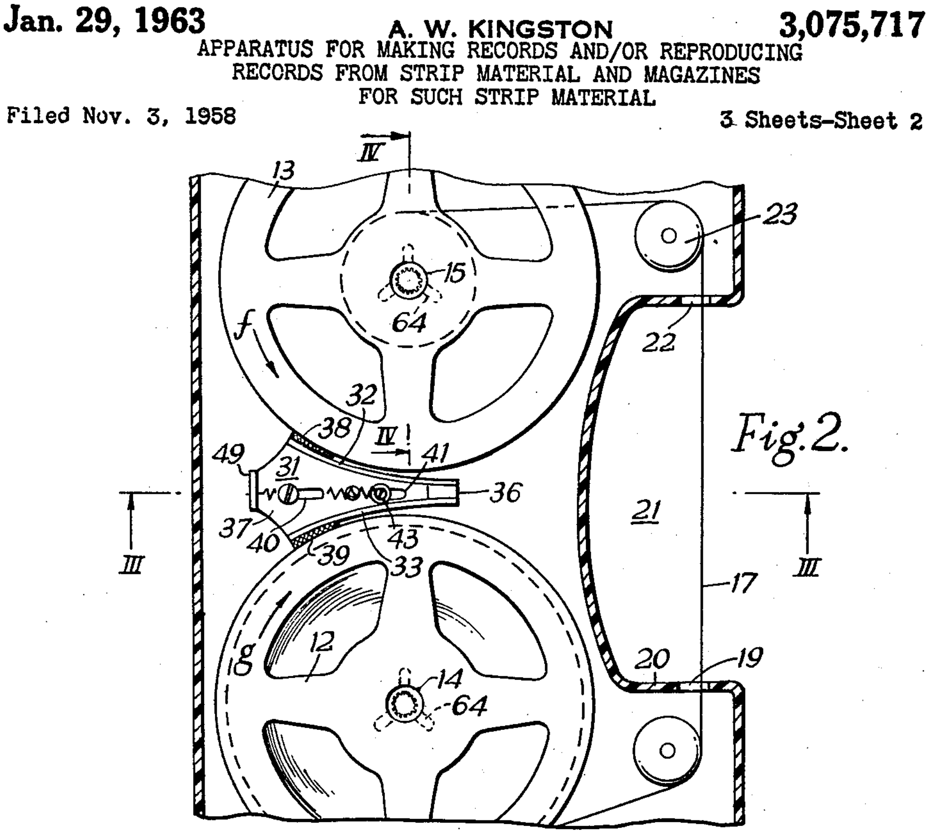
FIG. 2 is a part plan view of the magazine shown in FIG. 1, with the upper part of the casing removed.
Figure 3:
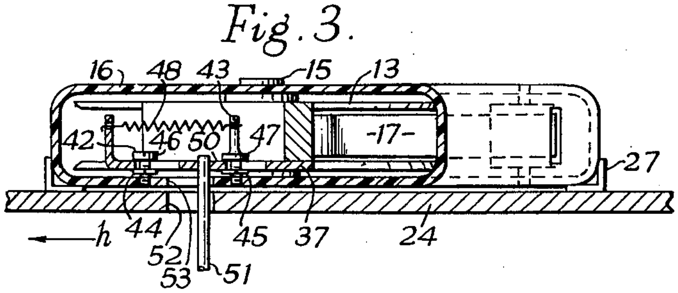
FIG. 3 is a sectional end elevation of the magazine shown in FIG. 2, the section being taken along the line III—III in FIG. 2.

In order that spools of this type may be used with the apparatus shown in FIG. 4, there is provided on the upper splined portion 55 of the spindle 54 a member 64 shown in dotted line in FIG. 2. It will be seen from FIG. 4 that in the absence of the magazine 11 the spindle 54 rises to a position in which the member 64 is above the upper surface of the tape deck 24. Thus, when a conventional spool is lowered on to the tape deck 24, the member 64 serves to lock it against rotation with respect to the spindle 54.

From what has been described, it will be apparent that the positioning of the magazine can be made rapidly in the event that the splines in the driving spindles do not register with the splines on the spool axles. The driving spindles are depressed and remain depressed until the apparatus is set in operation whereupon they move into engagement as hereinbefore described.

In a further embodiment of the invention (not shown), two pairs of driving spindles are provided in the apparatus for accommodating the magazines, one pair of spindles serving to drive the spools of a magazine of one spool size and the other pair serving to drive the spools of a magazine of another spool size.

It will be appreciated, however, that there are limits to the size of the magazine that can be employed and that a reduction in the size for a given tape is highly desirable.

Figure 5:
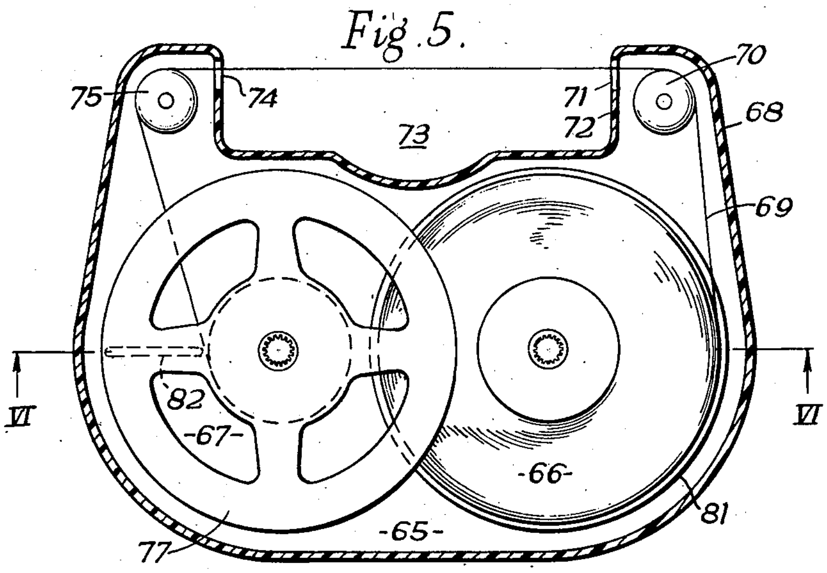
FIG. 5 is a plan view of a magazine according to a further embodiment of the invention.
Figure 6:
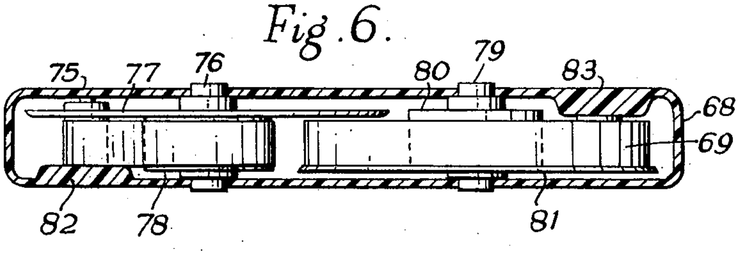
FIG. 6 is a sectional side elevation of the magazine shown in FIG. 5, taken on the line VI—VI in FIG. 5

Another embodiment of the present invention is shown in FIGS. 5 and 6 and comprises a magnetic tape magazine 65 including a feed spool 66 and a take-up spool 67 rotatably mounted in a casing 68. Magnetic tape 69 from the feed spool 66 passes first over a guide roller 70, freely rotatable within the casing 68, through an opening 71 in an end wall 72 of a recessed portion 73 of the casing 68, through the recess, through an opening 74 in the other end wall of the recessed portion 73, over a second guide roller 75, rotatably mounted within the casing 68, and on to the take-up spool 67.

As shown in FIG. 6, the spool 67 comprises an internally splined tubular axle 76 carrying a guide disc 77 and a central bobbin 78 upon which the tape 69 is wound. The spool 66 comprises an internally splined tubular axle 79 carrying a central bobbin 80 on which the tape 69 is wound and a lower guide disc 81. The casing 68 is provided with a rib 82 which extends radially from the axis of the spool 67 and a further rib 83 which extends radially from the axis of the spool 66.

It will readily be seen that the guide disc 77 serves to guide and retain not only the tape on the bobbin 78 but also that on the bobbin 80 and likewise the guide disc 81 serves to guide and retain not only the tape on the bobbin 80 but also that on the bobbin 78. The radially extending ribs 82 and 83 serve to prevent the wound tape on the bobbins from becoming displaced during handling of the magazine.

It will readily be seen that a considerable saving in space is obtained with a magazine so constructed since the axes of rotation of the two spools may be located in positions closer together than would be possible if guide discs were provided on each side of each spool, which has been the common practice hitherto.

It will be appreciated that if desired the tape may be guided by a disc mounted on each side of the bobbin 78, and no discs provided on the bobbin 81.

Referring again to FIG. 1, the two magnetic heads 28 and 30 are substantially identical. Each comprises an erasing part and a record/replay part energised and connected to conventional record, replay and erasing circuits. The magnetic head 28 nearest the feed spool 12 is so arranged that, when the magazine 11 is mounted on the tape deck, and the apparatus operated the tape 17 from the feed spool 12 passes first over the erasing part and then over the record/replay part, the said parts being arranged to record, replay and erase on only the lower part of a twin or multiple track tape. The magnetic head 30 nearest the take-up spool 13 is so arranged that the tape when moving in the reverse direction, that is to say from the take-up spool, passes first over the erasing part and then over the record/replay part, said parts being arranged to record, replay and erase on only the upper part of the tape.

In the operation of the apparatus, for example in the reproduction of a record recorded on the tape, a manually operable switch is moved to a position marked "Replay." In this position, the magnetic head 28 is rendered operative by connection of the circuits associated with the head 28 to reproduce the record on the lower part of the tape, the tape tensioning and spool locking device 31 is released and the magnetic head 30 is rendered inoperative by release of an associated pressure pad and disconnection of the electrical circuits associated with the head 30. A main switch is then depressed and the mechanism for driving the take-up spool 13 and capstan 29 is set in motion.

Figure 7:
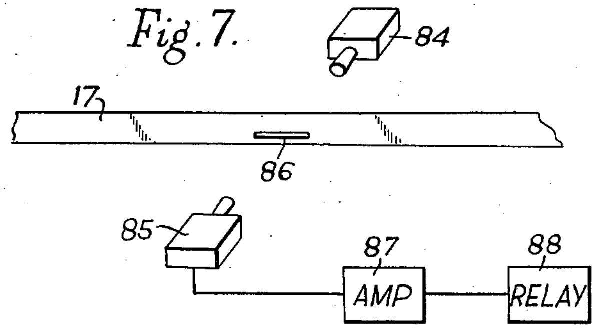
FIG. 7 is a schematic diagram of an apparatus according to yet another embodiment of the invention.

When the end of the record on the lower part of the tape 17 has been replayed apparatus now to be described with reference to FIG. 7 becomes operative. Referring to FIG. 7 a light source 84 is located on the tape deck at a position such that it directs light to a photoelectric cell 85 along a path interrupted by the tape 17. The tape in the region of one or each end is provided with a slot 86 so positioned as to allow the passage of light from the source 84 to the photoelectric cell 85.

In operation, when the end of the record on the lower part of the tape 17 has been replayed, the photoelectric cell 85 becomes energised by the light from the source 84 passing through the slot 86. The output from the cell 85 is amplified in an amplifier 87 and applied to operate an electromagnetic relay 88, which thereupon causes the driving mechanism for the feed and take-up spools and the capstan roller to reverse. At the same time, operation of the relay causes the magnetic head 30 to become effective to replay the record on the upper part of the tape 17 and the magnetic head 28 to be rendered ineffective by disconnection of the pressure pad and electrical circuits associated therewith. Automatic reversal of the tape 17 and switching of the magnetic heads 28 and 30 in this way ensures a substantially uninterrupted replay of the records on both upper and lower parts of the tape 17.

It will be appreciated that continuous replaying may if desired be obtained by providing a modified switching circuit adapted to cause repeated reversal of the driving mechanisms for the spools and capstan and the switching of the magnetic heads upon successive energising of the photoelectric cell.

It will be appreciated that where magazines in accordance with the various embodiments of the present invention are symmetrically arranged the magazine can be lifted from the apparatus, inverted and replaced in operative engagement with the apparatus, the originally upper track of a twin track tape taking a lowermost position and the record thereon can be reproduced.

With such an arrangement it is then possible to start at the second half of a musical work recorded on a twin track magnetic tape.

A magazine as hereinbefore specifically described may with advantage be provided with a protective cover which covers the recess in the front edge and protects the exposed portion of the tape therein. The cover may take the form of two sliding cover members slidably mounted in the casing and adapted to be moved together into abutting relationship from positions at the sides of the recess.

In a preferred arrangement a device is provided for automatically stopping the drive mechanisms for the spools and capstan if the tape breaks, and this device is adapted simultaneously to operate the tape tensioning and spool locking device so as to prevent the spools from rotating and causing tape spill over.

It will furthermore be appreciated that, if desired, magazines may be employed in which the feed and take-up spools are in concentric face-to-face relationship and are driven from a common driving spindle through a ratchet mechanism.

It will be readily appreciated that magazines for use with apparatus as hereinbefore described may be supplied with tape on which a record has been made and the whole so made as to reduce to a minimum the possibility of mishandling of the tape. An indicator may be provided on the magazine to indicate the remaining playing or recording time.

If desired, the spool locking and tensioning device as hereinbefore described may be provided with means whereby it can be manually moved to the disengaged position. Alternatively, it may be moved manually, when the magazine is removed from the recording and reproducing apparatus, by inserting a pin corresponding to pin 51 in FIG. 3 and moving the pin with respect to magazine in the direction of the arrow *h*.

I claim:

1. A magazine for a record strip comprising a casing, a feed spool and a take-up spool rotatably mounted within the casing, a record strip extending between the said spools, guides in the casing guiding the said strip and means for maintaiing the record strip under tension comprising strip-tensioning means movably mounted on the casing, and biasing means for moving said strip-tensioning means against at least one spool to impart slight rotational tensioning movement thereto relative to the other spool while moving into holding engagement with both spools.

2. A magazine as claimed in claim 1, in which said spools are in edge-to-edge spaced relationship and said strip-tensioning device is located between the said spools.

3. A magazine as claimed in claim 2 in which said strip-tensioning means comprises a frame mounted within the casing, the frame being movable parallel to the plane of the spools in a direction at right angles to said line of centres, and two spool-engaging members mounted on said frame for respective engagement with the peripheries of said spools on the side of the line joining the centres of the spools remote from the strip record extending between the spools.

4. A magazine as claimed in claim 3 in which each spool-engaging member is of arcuate form to conform to the periphery of the spool which it engages and is mounted at one end on the frame.

5. A magazine as claimed in claim 4 in which each spool-engaging member comprises a resilient metal strip which is provided with a friction pad on the concave surface and adjacent the free end thereof.

6. A magazine as claimed in claim 5 in which said biasing means comprises a tension spring one end of which is attached to the casing and the other end of which is attached to the frame.

7. A magazine as claimed in claim 2 for use with a sound recording and reproducing apparatus having a movable actuating member, the strip-tensioning means including means engageable with said actuating member to effect disengagement of the strip-tensioning device.

8. A record-strip magazine for use with a sound recording and reproducing apparatus, comprising a casing formed with a recess and having an aperture in the casing on each side of the recess, a feed spool and a take-up spool disposed in edge-to-edge spaced relationship within the magazine for rotation by drive means of the recording and reproducing apparatus, a record strip extending between the said spools, guides in the casing guiding the record strip to extend outside the casing in a rectilinear path between said apertures, a strip-tensioning device movably mounted within the casing for movement between the spools in a direction in the plane of the spools transverse to the line of centres of the spools, said strip-tensioning device having parts for engagement with the peripheries of said spools to impart slight rotational tensioning movement to said spools while moving into locking engagement therewith, means on said strip-tensioning device engageable with operating means of the recording and reproducing apparatus to disengage said device from said spools, and biasing means for engaging said parts of said strip-tensioning device with the peripheries of the spools upon removal of the magazine from said apparatus, thereby to effect counter-rotation of said spools and tensioning of said tape, whereby the portion of said tape extending between said apertures outside the casing is maintained straight and taut for presentation to recording and reproducing heads on said apparatus until the magazine is returned to the apparatus.

9. A record-strip magazine for use with a sound recording and reproducing apparatus, comprising a casing, a feed spool and a take-up spool disposed in edge-to-edge spaced relationship within the casing for rotation by drive means of the recording and reproducing apparatus, a record strip extending between the said spools, guides in the casing guiding the said strip, a strip-tensioning device movably mounted within the casing for movement between the spools, said strip-tensioning device having parts for engagement with the peripheries of said spools to impart slight rotational tensioning movement to said spools while moving into holding engagement therewith, and biasing means for engaging said parts of said strip-tensioning device with the peripheries of the spools.

10. In combination, a magazine as claimed in claim 1 wherein said spools have axles rotatably mounting the spools in the casing, and an apparatus for recording and reproducing from said record strip including a pair of spaced axially movable and rotatable spindles mounted in the apparatus, means for rotating said spindles, means biasing said spindles for axial movement, and a plurality of axially-extending splines and slots on said spindles and said axles, respectively, for locking each axle to a respective one of said spindles upon initiation of rotation of the spindles and axial movement of the spindles under the action of the biasing means.

11. The combination claimed in claim 10 wherein each of said spindles carries a transversely-extending pin for engagement in a radial slot of a conventional tape spool.

(References on following page)

References Cited in the file of this patent

UNITED STATES PATENTS

| | | |
|---|---|---|
| 2,475,036 | Lopez-Henriquez | July 5, 1949 |
| 2,499,895 | Walker | Mar. 7, 1950 |
| 2,584,733 | Owens | Feb. 5, 1952 |
| 2,612,565 | Heller | Sept. 30, 1952 |
| 2,702,834 | Golle et al. | Feb. 22, 1955 |
| 2,778,880 | Eash | Jan. 22, 1957 |
| 2,804,508 | Mastling et al. | Aug. 27, 1957 |
| 2,862,674 | Herrmann | Dec. 2, 1958 |
| 2,894,700 | Roberts et al. | July 14, 1959 |
| 2,926,861 | Murdoch | Mar. 1, 1960 |
| 2,943,805 | Loewe | July 5, 1960 |

FOREIGN PATENTS

| | | |
|---|---|---|
| 707,855 | Great Britain | Apr. 21, 1954 |